US008903864B2

(12) United States Patent
Hannan et al.

(10) Patent No.: US 8,903,864 B2
(45) Date of Patent: Dec. 2, 2014

(54) METHODS AND APPARATUS TO OBTAIN ANONYMOUS AUDIENCE MEASUREMENT DATA FROM NETWORK SERVER DATA FOR PARTICULAR DEMOGRAPHIC AND USAGE PROFILES

(71) Applicant: The Nielsen Company (US), LLC, Schaumburg, IL (US)

(72) Inventors: Kevin Michael Hannan, San Mateo, CA (US); Achilleas Papakostas, Dallas, TX (US); Albert Ronald Perez, San Francisco, CA (US); Michael Andrew Yonker, Dallas, TX (US); Austin William Albino, San Francisco, CA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 70 days.

(21) Appl. No.: 13/649,794

(22) Filed: Oct. 11, 2012

(65) Prior Publication Data

US 2013/0036435 A1 Feb. 7, 2013

Related U.S. Application Data

(63) Continuation of application No. 12/827,865, filed on Jun. 30, 2010, now Pat. No. 8,307,006.

(51) Int. Cl.
*G06F 17/30* (2006.01)
*G06Q 30/02* (2012.01)

(52) U.S. Cl.
CPC ............... *G06Q 30/02* (2013.01); *G06F 17/30* (2013.01)
USPC ............ 707/791; 707/802; 707/822; 707/600

(58) Field of Classification Search
CPC ...................................................... G06F 17/30
USPC ................................................ 707/600–899
See application file for complete search history.

(56) References Cited

U.S. PATENT DOCUMENTS

| 5,341,216 A | 8/1994 | Hoffart |
| 5,355,161 A | 10/1994 | Bird et al. |

(Continued)

FOREIGN PATENT DOCUMENTS

| CN | 1346571 | 4/2002 |
| CN | 101593210 | 12/2009 |

(Continued)

OTHER PUBLICATIONS

El Emam, Khaled, "Data Anonymizatlon Practices in Clinical Research," XP55008028, retrieved on Sep. 26, 2011 from <http://lwww.ehealthinformation.caldocumentslHealthCanadaAnonymizationReport.pdf>, dated May 8, 2006 (16 pages).

(Continued)

*Primary Examiner* — Isaac M Woo
(74) *Attorney, Agent, or Firm* — Hanley, Flight & Zimmerman, LLC

(57) ABSTRACT

Methods and apparatus to obtain anonymous audience measurement data from network server data for particular demographic and usage profiles are disclosed. An example method to provide anonymous audience measurement data to an audience measurement entity disclosed herein comprises obtaining a demographic profile and a network usage profile, sampling customer data stored in a customer database not accessible by the audience measurement entity to generate a customer sample representative of the demographic profile and the network usage profile without customer intervention, the customer sample including customer identification information, processing log data obtained from a network server not accessible by the audience measurement entity using the customer identification information to determine audience measurement data associated with customers in the customer sample, and removing the customer identification information from the audience measurement data to prepare the anonymous audience measurement data for the audience measurement entity.

23 Claims, 7 Drawing Sheets

(56) References Cited

U.S. PATENT DOCUMENTS

| | | |
|---|---|---|
| 5,450,122 A | 9/1995 | Keene |
| 5,481,294 A | 1/1996 | Thomas et al. |
| 5,481,296 A | 1/1996 | Cragun et al. |
| 5,485,518 A | 1/1996 | Hunter et al. |
| 5,488,408 A | 1/1996 | Maduzia et al. |
| 5,521,631 A | 5/1996 | Budow et al. |
| 5,535,209 A | 7/1996 | Glaser et al. |
| 5,539,822 A | 7/1996 | Lett |
| 5,636,346 A | 6/1997 | Saxe |
| 5,697,844 A | 12/1997 | Von Kohorn |
| 5,701,582 A | 12/1997 | DeBey |
| 5,724,521 A | 3/1998 | Dedrick |
| 5,734,720 A | 3/1998 | Salganicoff |
| 5,758,257 A | 5/1998 | Herz et al. |
| 5,872,588 A | 2/1999 | Aras et al. |
| 5,892,826 A | 4/1999 | Brown et al. |
| 5,956,716 A | 9/1999 | Kenner et al. |
| 5,974,299 A | 10/1999 | Massetti |
| 6,002,393 A | 12/1999 | Hite et al. |
| 6,005,561 A | 12/1999 | Hawkins et al. |
| 6,025,837 A | 2/2000 | Matthews, III et al. |
| 6,061,451 A | 5/2000 | Muratani et al. |
| 6,088,722 A | 7/2000 | Herz et al. |
| 6,166,730 A | 12/2000 | Goode et al. |
| 6,189,008 B1 | 2/2001 | Easty et al. |
| 6,216,265 B1 | 4/2001 | Roop et al. |
| 6,226,618 B1 | 5/2001 | Downs et al. |
| 6,253,238 B1 | 6/2001 | Lauder et al. |
| 6,286,104 B1 | 9/2001 | Buhle et al. |
| 6,289,514 B1 | 9/2001 | Link et al. |
| 6,356,945 B1 | 3/2002 | Shaw et al. |
| 6,490,587 B2 | 12/2002 | Easty et al. |
| 6,748,427 B2 | 6/2004 | Drosset et al. |
| 6,983,478 B1 | 1/2006 | Grauch et al. |
| 6,988,108 B2 | 1/2006 | Bernhardt et al. |
| 7,080,136 B2 | 7/2006 | Duffield et al. |
| 7,124,938 B1 | 10/2006 | Marsh |
| 7,130,778 B1 | 10/2006 | Connell et al. |
| 7,139,723 B2 | 11/2006 | Conkwright et al. |
| 7,444,655 B2 | 10/2008 | Sardera |
| 8,307,006 B2 * | 11/2012 | Hannan et al. ............... 707/791 |
| 8,381,241 B2 | 2/2013 | Ramaswamy et al. |
| 8,707,340 B2 | 4/2014 | Ramaswamy et al. |
| 2001/0023436 A1 | 9/2001 | Srinivasan et al. |
| 2001/0034708 A1 | 10/2001 | Walker et al. |
| 2001/0049620 A1 | 12/2001 | Blasko |
| 2001/0051996 A1 | 12/2001 | Cooper et al. |
| 2002/0010919 A1 | 1/2002 | Lu et al. |
| 2002/0019769 A1 | 2/2002 | Barritz et al. |
| 2002/0031224 A1 | 3/2002 | Basawapatna et al. |
| 2002/0044225 A1 | 4/2002 | Rakib |
| 2002/0053078 A1 | 5/2002 | Holtz et al. |
| 2002/0056086 A1 | 5/2002 | Yuen |
| 2002/0056087 A1 | 5/2002 | Berezowski et al. |
| 2002/0059637 A1 | 5/2002 | Rakib |
| 2002/0078441 A1 | 6/2002 | Drake et al. |
| 2002/0110360 A1 | 8/2002 | Potrebic |
| 2002/0112048 A1 | 8/2002 | Gruyer et al. |
| 2002/0120925 A1 | 8/2002 | Logan |
| 2002/0129368 A1 | 9/2002 | Schlack et al. |
| 2002/0191810 A1 | 12/2002 | Fudge et al. |
| 2002/0194592 A1 | 12/2002 | Tsuchida et al. |
| 2003/0001880 A1 | 1/2003 | Holtz et al. |
| 2003/0005430 A1 | 1/2003 | Kolessar |
| 2003/0037333 A1 | 2/2003 | Ghashghai et al. |
| 2003/0041143 A1 | 2/2003 | Ronald et al. |
| 2003/0149975 A1 | 8/2003 | Eldering et al. |
| 2003/0149991 A1 | 8/2003 | Reidhead et al. |
| 2003/0154128 A1 | 8/2003 | Liga et al. |
| 2003/0208763 A1 | 11/2003 | McElhatten et al. |
| 2003/0208767 A1 | 11/2003 | Williamson et al. |
| 2003/0229892 A1 | 12/2003 | Sardera |
| 2004/0019900 A1 | 1/2004 | Knightbridge et al. |
| 2004/0039914 A1 | 2/2004 | Barr et al. |
| 2005/0055316 A1 | 3/2005 | Williams |
| 2005/0138674 A1 | 6/2005 | Howard et al. |
| 2005/0267750 A1 | 12/2005 | Steuer et al. |
| 2005/0278731 A1 | 12/2005 | Cameron et al. |
| 2007/0157262 A1 | 7/2007 | Ramaswamy et al. |
| 2007/0186228 A1 | 8/2007 | Ramaswamy et al. |
| 2009/0070443 A1 * | 3/2009 | Vanderhook et al. ......... 709/222 |
| 2009/0282430 A1 | 11/2009 | Gupta et al. |
| 2010/0211967 A1 | 8/2010 | Ramaswamy et al. |
| 2011/0088052 A1 | 4/2011 | Ramaswamy et al. |
| 2012/0005213 A1 | 1/2012 | Hannan et al. |
| 2013/0152117 A1 | 6/2013 | Ramaswamy et al. |

FOREIGN PATENT DOCUMENTS

| | | |
|---|---|---|
| CN | 101673304 | 3/2010 |
| EP | 0817486 | 1/1998 |
| EP | 1166555 | 10/2000 |
| WO | 9628904 | 9/1996 |
| WO | 9637983 | 11/1996 |
| WO | 9831155 | 7/1998 |
| WO | 9959275 | 11/1999 |
| WO | 0033565 | 6/2000 |
| WO | 0033578 | 6/2000 |
| WO | 0131497 | 5/2001 |
| WO | 0147257 | 6/2001 |
| WO | 0147273 | 6/2001 |
| WO | 0176248 | 10/2001 |
| WO | 03071737 | 8/2003 |
| WO | 2004051997 | 6/2004 |
| WO | 2005079501 | 9/2005 |
| WO | 2005107110 | 11/2005 |
| WO | 2006130658 | 12/2006 |

OTHER PUBLICATIONS

McCaa et al., "IPUMS—International High Precision Population Census Microdata Samples: Balancing the Privacy-Quality Tradeoff by Means of Restricted Access Extracts," Privacy in Statistical Databases Lecture Notes in Computer Science (LNCS), vol. 4302, Springer-Verlag, 2006 (8 pages).

Riphagen et al., "In Search of the Elusive User: Gathering Information on the Web Server Access," NCSA, Oct. 14, 1996 (14 pages).

Samarati, Pierangela, "Protecting Respondents' Identities in Microdata Release," IEEE Transactions on Knowledge and Data Engineering, vol. 13, No. 6, Nov./Dec. 2001 (18 pages).

Canadian Intellectual Property Office, "Office Action," issued in connection with Canadian Application No. 2,556,553, on Jun. 15, 2010 (10 pages).

EPO, "Extended European Search Report," issued in connection with EP Patent Application No. 11005351.9, on Oct. 7, 2011 (7 pages).

International Bureau, "International Preliminary Report on Patentability," in connection with PCT Application No. PCT/US2005/005271, mailed Aug. 22, 2006 (4 pages).

International Bureau, "International Preliminary Report on Patentability," issued in connection with PCT Application No. PCT/US2005/013765, mailed Feb. 13, 2007 (4 pages).

PCT, "International Search Report," issued by the International Searching Authority in connection with PCT Application No. PCT/US2005/005271, mailed Mar. 23, 2006 (1 page).

PCT, "Written Opinion of the International Searching Authority," issued by the International Searching Authority in connection with PCT Application No. PCT/US2005/005271, mailed Mar. 23, 2006 (4 pages).

PCT, "International Search Report," issued by the International Searching Authority in connection with PCT Application No. PCT/US2005/013765, mailed Jan. 26, 2007 (4 pages).

PCT, "Written Opinion of the International Searching Authority," issued by the International Searching Authority in connection with PCT Application No. PCT/US2005/013765, mailed Jan. 26, 2007 (3 pages).

USPTO, "Election/Restriction Requirement," issued in connection with U.S. Appl. No. 10/589,149, on Feb. 6, 2009 (7 pages).

USPTO, "Office Action," issued in connection with U.S. Appl. No. 10/589,149, on Jun. 9, 2009 (27 pages).

(56) References Cited

OTHER PUBLICATIONS

USPTO, "Office Action," issued in connection with U.S. Appl. No. 10/589,149, on Jan. 6, 2010 (30 pages).
USPTO, "Office Action," issued in connection with U.S. Appl. No. 10/589,149, on Mar. 12, 2010 (3 pages).
USPTO, "Final Office Action," issued in connection with U.S. Appl. No. 10/589,149, on Jul. 19, 2010 (33 pages).
USPTO, "Election/Restriction Requirement," issued in connection with U.S. Appl. No. 11/550,261, on Feb. 24, 2009 (6 pages).
USPTO, "Office Action," issued in connection with U.S. Appl. No. 11/550,261, on Apr. 16, 2009 (16 pages).
USPTO, "Office Action," issued in connection with U.S. Appl. No. 11/550,261, on Oct. 28, 2009 (19 pages).
USPTO, "Office Action," issued in connection with U.S. Appl. No. 12/769,163, on Sep. 23, 2010 (16 pages).
USPTO, "Final Office Action," issued in connection with U.S. Appl. No. 12/769,163, on Apr. 5, 2011 (22 pages).
USPTO, "Notice of Allowance," issued in connection with U.S. Appl. No. 12/827,865, on Feb. 22, 2012 (9 pages).
USPTO, "Notice of Allowance," issued in connection with U.S. Appl. No. 12/827,865, on Jul. 5, 2012 (8 pages).
United States Patent and Trademark Office, "Notice of Allowance", issued in connection with U.S. Appl. No. 12/769,163, dated Oct. 15, 2012 (9 pages).
United States Patent and Trademark Office, "Notice of Allowance", issued in connection with U.S. Appl. No. 13/762,025, dated Nov. 27, 2013 (10 pages).
United States Patent and Trademark Office, "Non-Final Office Action", issued in connection with U.S. Appl. No. 12/970,710, dated Aug. 13, 2012 (24 pages).
United States Patent and Trademark Office, "Final Office Action", issued in connection with U.S. Appl. No. 12/970,710, dated Apr. 12, 2013 (28 pages).
Canadian Intellectual Property Office, "Office Action", issued in connection with Canadian Patent Application No. 2,556,553, dated Jun. 27, 2011 (3 pages).
Canadian Intellectual Property Office, "Office Action", issued in connection with Canadian Patent Application No. 2,556,553, dated Aug. 23, 2012 (3 pages).
Canadian Intellectual Property Office, "Office Action", issued in connection with Canadian Patent Application No. 2,556,553, dated Feb. 14, 2014 (2 pages).
Canadian Intellectual Property Office, "Office Action", issued in connection with Canadian Patent Application No. 2,563,834, dated Jan. 7, 2014 (3 pages).
Canadian Intellectual Property Office, "Office Action", issued in connection with Canadian Patent Application No. 2,744,580, dated Jul. 24, 2013 (3 pages).
IP Australia, "Examination Report", issued in connection with Australian Patent Application No. 2011203053, dated Jul. 24, 2012 (3 pages).
IP Australia, "Notice of Acceptance", issued in connection with Australian Patent Application No. 2011203053, dated Aug. 13, 2013 (2 pages).
The State Intellectual Property Office of China, "First Office Action", issued in connection with Chinese Patent Application No. 201110230823, dated Nov. 26, 2012 (13 pages).
The State Intellectual Property Office of China, "Second Office Action", issued in connection with Chinese Patent Application No. 201110230823, dated Aug. 6, 2013 (10 pages).

* cited by examiner

METHODS AND APPARATUS TO OBTAIN ANONYMOUS AUDIENCE MEASUREMENT DATA FROM NETWORK SERVER DATA FOR PARTICULAR DEMOGRAPHIC AND USAGE PROFILES

RELATED APPLICATION(S)

This patent is a continuation of U.S. patent application Ser. No. 12/827,865, entitled "Methods and Apparatus to Obtain Anonymous Audience Measurement Data from Network Server Data for Particular Demographic and Usage Profiles" and filed on Jun. 30, 2010. U.S. patent application Ser. No. 12/827,865 is hereby incorporated by reference in its entirety.

FIELD OF THE DISCLOSURE

This disclosure relates generally to audience measurement and, more particularly, to methods and apparatus to obtain anonymous audience measurement data from network server data for particular demographic and usage profiles.

BACKGROUND

Media content is provided to audiences using a variety of non-traditional techniques, such as via the Internet and various mobile telephone networks. Accordingly, content providers and advertisers are eager to extend audience measurement of media content consumption beyond traditional broadcast television markets. However, conventional panel-based techniques for audience measurement in traditional television markets can be expensive to implement due to challenges encountered in recruiting a panel that yields a representative sample of the desired demographic profile. Additionally, because such panels typically include only a small subset of all audience members, the conventional panel-based techniques often do not capture content accessed by relatively few audience members (e.g., such as niche content). Although allowing an audience measurement entity to access gateway and other network server logs tracking data traffic (including access to media content), as well as customer relationship databases storing customer data that may be used to determine customer demographics, would avoid requiring a panel, such access is generally not feasible due to privacy concerns.

DETAILED DESCRIPTION

Figure 1:
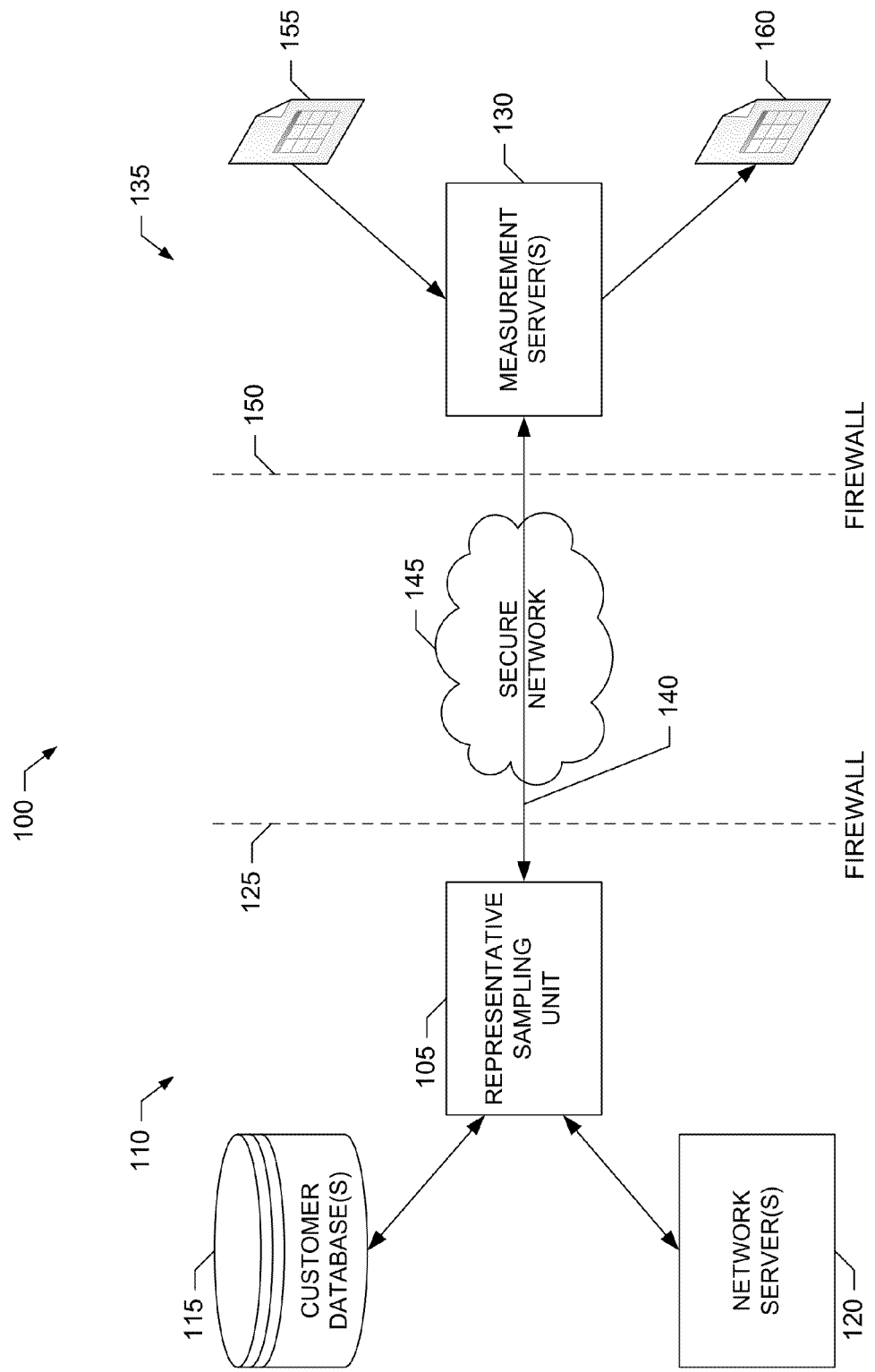
FIG. 1 is block diagram of an example environment of use in which an example representative sampling unit can obtain anonymous audience measurement data from network server data for particular demographic and usage profiles.

Methods and apparatus to obtain anonymous audience measurement data from network server data for particular demographic and usage profiles are disclosed herein. Although the following discloses example methods and apparatus including, among other components, software executed on hardware, it should be noted that such methods and apparatus are merely illustrative and should not be considered as limiting. For example, it is contemplated that any or all of these hardware and software components could be implemented exclusively in hardware, exclusively in software, exclusively in firmware, or in any combination of hardware, software, and/or firmware. Additionally, though described in connection with example implementations using mobile/wireless networks, access points and other network structures and devices, the example methods and apparatus described herein are not limited thereto. Accordingly, while the following describes example methods and apparatus, persons having ordinary skill in the art will readily appreciate that the examples provided are not the only way to implement such methods and apparatus.

As used herein, the term customer generally refers to any person or entity able to consume media content provided by any provider, source, technology, etc. As such, a customer can be an audience member, a subscriber, a user, a viewer, a listener, etc. Furthermore, a customer as referred to herein is not limited to a paying customer and includes a customer able to access content without any exchange of payment or without having any other relationship with the provider of the content.

In an example disclosed technique to provide anonymous audience measurement data to an audience measurement entity, an example representative sampling unit is included in a service provider's network and obtains a demographic profile and a network usage profile from the audience measurement entity, which is separate from the service provider. In an example implementation, the demographic profile includes a set of demographic categories, with each demographic category including a set of target segments associated respectively with a set of target population percentages. Similarly, the network usage profile in such an example implementation includes a set of usage categories associated respectively with another set of target population percentages.

Given the demographic profile and the network usage profile specified by the audience measurement entity, the representative sampling unit then samples customer data stored in a customer database not accessible by the audience measurement entity to generate, without customer intervention, a customer sample representative of the demographic profile and the network usage profile. In an example implementation, the generated customer sample includes customer identification information, such as phone numbers, Internet protocol (IP) addresses, usernames, personal identification numbers (PINs), cookie identifiers, etc., as well as other demographic information, for a subset of customers representative of the demographic profile and the network usage profile. Using the customer identification information included in the generated customer sample, the representative sampling unit is able to retrieve and process log data from a network server, such as a gateway or other network server, not accessible by the audience measurement entity to determine audience measurement data associated with customers in the customer sample. To render the audience measurement data anonymous, the representative sampling unit scrubs the audience measurement data to remove any customer identification information (e.g., and to replace such removed information with anonymous identifiers incapable of identifying particular customers) before providing the data to the audience measurement entity. However, the anonymous measurement data retains other demographic information to enable classification of the data according to the specified demographic and network usage profiles.

Unlike many conventional audience measurement techniques, the example anonymous server sampling techniques described herein do not utilize customer/audience panels. Instead, the example techniques described herein determine anonymous audience measurement data directly from (1) a service provider's customer relationship database(s) storing customer information records/data that include identification and demographic data, and (2) the service provider's network server logs that track data traffic/events associated with, for example, media server and/or media content access. Additionally, the anonymous audience measurement data is determined by the representative sampling unit to be representative of demographic and usage profiles initially specified by an audience measurement entity, unlike many conventional techniques in which the demographic composition is unknown until after the measurement data is processed. Furthermore, in the disclosed example anonymous server sampling techniques, the audience measurement entity is separate from the service provider, in contrast with other measurement techniques in which the service provider also acts as the measurement entity. However, because the audience measurement data is anonymous when exported to the audience measurement entity, privacy is maintained despite the fact that the audience measurement entity is separate from the service provider.

Turning to the figures, a block diagram of an example environment of use 100 in which an example representative sampling unit 105 may obtain anonymous audience measurement data from network server data for particular (e.g., specified) demographic and usage profiles is illustrated in FIG. 1. The environment of use 100 includes an example provider network 110 operated by a service provider to provide media content and other services to one or more customers (not shown). The provider network 110 can be implemented by any type of service provider, such as, for example, a mobile communications service provider, an Internet service provider, a cable television service provider, a satellite television service provider, a satellite radio service provider, etc.

The provider network 110 includes one or more example customer databases 115 storing customer records containing customer data associated with customers of the service provider. A customer database 115 can correspond to, for example, a customer relationship management (CRM) database, a RADIUS server, etc., or any other type of database or server storing customer-related information to enable the service provider to provide media content and other communication services to its customers. In examples in which the provider network 110 includes multiple customer databases 115, some or all of the multiple customer databases 115 may be co-located or reside in separate locations. In the illustrated example, the customer data stored in the customer records of the customer database(s) 115 includes customer identification and other demographic information. Examples of the customer identification information stored in the customer database(s) 115 can include, but is not limited, customer device identification information, such as any, some or all of phone numbers of mobile and/or other phones used by customers to access the provider network 110, IP addresses, medium access control (MAC) addresses and/or other device identifying information for customer devices used to access the provider network 110, etc. Customer identification information can also include personal identification information, such as any, some or all of customer names, addresses, identification numbers, account numbers, etc. Examples of other demographic information stored in the customer database(s) 115 can include, but is not limited, information regarding any, some or all of a customer's age, ethnicity, income, education, etc., (e.g., provided voluntarily by customers in applications for service, in response to one or more customer surveys, etc.) as well as information concerning services, products, subscriptions, etc., purchased by the customer from the service provider.

The provider network 110 also includes one or more example networks servers 120 to route and otherwise process data traffic within the provider network 110. A network server 120 can correspond to, for example, a gateway, such as a wireless access point (WAP) gateway, a router, a customer access server (CAS), an IP probe, a proxy server, a content adaptation server, etc. In examples in which the provider network 110 includes multiple networks servers 120, some or all of the multiple networks servers 120 may be co-located or reside in separate locations. Additionally, the networks server(s) 120 may be co-located with or reside in locations separate from the customer database(s) 115. The network server(s) 120 maintain server logs that track data traffic and other network events associated with customer use of the provider network 110. For example, the server logs may track the addresses of particular media content and/or other content servers, hosts, etc., accessed by customer devices, the names of particular media or other content accessed, the times when the servers/hosts and/or the content was accessed, etc. Additionally, the server log data is indexed by customer device identification information (e.g., such as device phone numbers, IP addresses, etc.) to enable association of data traffic and network events with particular customer devices and, thus, particular customers.

The provider network 110 is a secure and private network protected by an example firewall 125, which may be implemented by any type of firewall device or application. Because the provider network is secure and private, the representative sampling unit 105 is included in the provider network 110 to allow an audience measurement entity that is separate from the service provider to obtain audience measurement data derived from the customer data stored in the customer database(s) 115 and the server logs stored by the network server(s) 120, even though the customer database(s) 115 and the network server(s) 120 are inaccessible by the audience measurement entity. Furthermore, to maintain customer privacy, the audience measurement data provided by the representative sampling unit 105 to the audience measurement entity is anonymous and, thus, does not contain personal identification information, but can include other demographic information.

Figure 2:
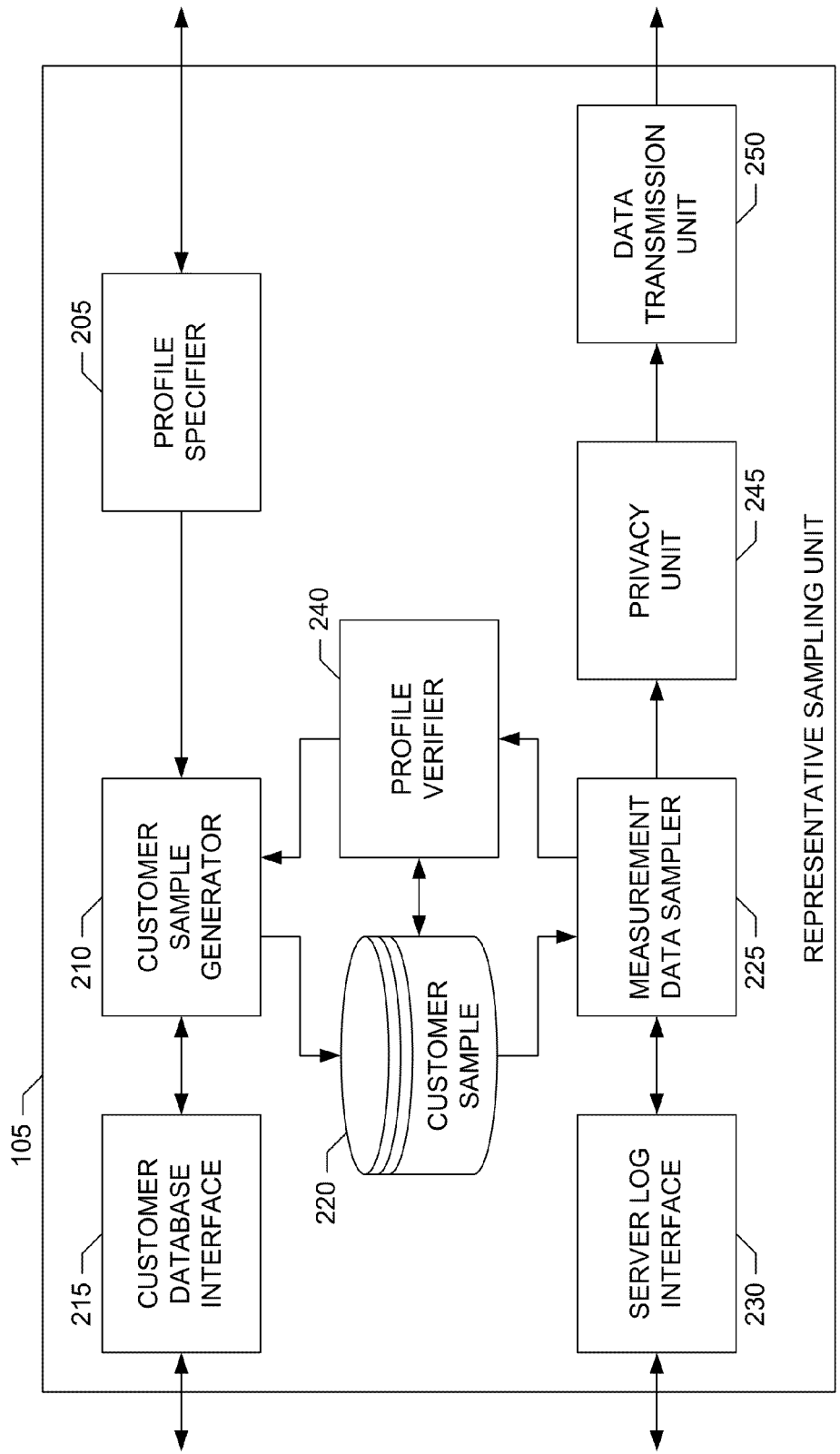
FIG. 2 is a block diagram of an example implementation of the representative sampling unit of FIG. 1.

In the illustrated example, the representative sampling unit 105 generates the anonymous measurement data for a subset of customers having a particular demographic profile and a particular network usage profile specified by the audience measurement entity. For example, given specified demographic and network usage profiles, the representative sampling unit 105 samples (e.g., once or via several iterations) the customer data stored in the customer database(s) 115 to generate, without customer intervention, a customer sample containing a subset of customers representative of the specified demographic and network usage profiles. Additionally or alternatively, the customer database(s) 115 may already determine and track the demographics and/or network usage of the customers of the provider network 110. In such an example, the representative sampling unit 105 may interrogate the customer database(s) 115 to obtain the demographic and/or network usage profiles as determined and tracked by the customer database(s) 115 (e.g., instead of receiving the demographic and/or usage profiles from the audience measurement entity). The representative sampling unit 105 may also interrogate the customer database(s) 115 to obtain a customer sample representative of these demographic and/or network usage profiles as determined and tracked by the customer database(s) 115. Then, in any of these examples, using customer identification information (e.g., customer device identification information) included in the generated customer sample (e.g., generated from the demographic and/or usage profiles provided by the audience measurement entity or determined and tracked by the customer database(s) 115), the representative sampling unit 105 retrieves and processes log data from the network server(s) 120 to determine audience measurement data associated with the customers in the customer sample. The representative sampling unit 105 removes any customer identification information from the audience measurement data determined from the server logs to maintain privacy (e.g., and replaces such removed information with anonymous identifiers), but retains other demographic information to enable classification of the anonymous audience measurement data according to the specified demographic and network usage profiles. An example implementation of the representative sampling unit 105 is illustrated in FIG. 2 and described in greater detail below.

In the illustrated example, the representative sampling unit 105 communicates with one or more example measurement servers 130 included in an example measurement entity network 135 using an example secure communication link 140 carried via an example communication network 145, such as the Internet, a dedicated network, or any other type of communication network. The measurement entity network 135 is also a secure, private network, and is protected by an example firewall 150, which may be implemented by any type of firewall device or application. The secure communication link 140 can be implemented by, for example, a virtual private network (VPN), a secure file transfer protocol (FTP) session, etc.

Figure 3:
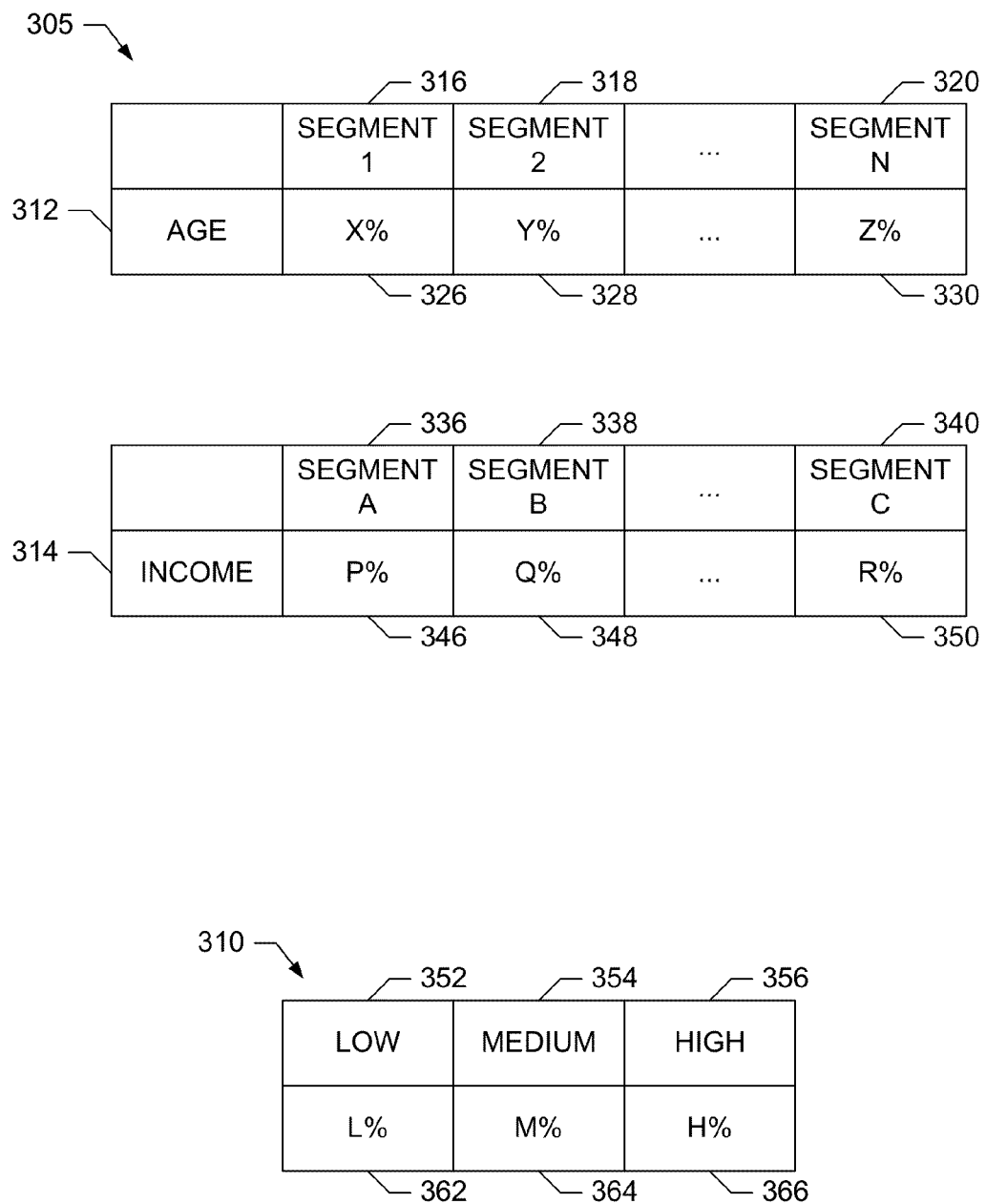
FIG. 3 illustrates an example demographic profile and an example usage profile that may be processed by the representative sampling unit of FIGS. 1 and/or 2.

The measurement server(s) 130 accept profile configuration file(s) 155 specifying a particular demographic profile and a particular network usage profile for which audience measurement data is to be determined by the representative sampling unit 105. The measurement server(s) 130 convey the demographic and network usage profiles specified via the profile configuration file(s) 155 to the representative sampling unit 105 via the secure communication link 140. Examples of a demographic profile and a network usage profile that could be specified using the profile configuration file(s) 155 are illustrated in FIG. 3 and described in greater detail below.

The measurement server(s) 130 also generate report(s) 160 from the anonymous audience measurement data determined by the representative sample unit 105 and downloaded to the measurement server(s) 130 via the secure communication link 140. The report(s) 160 utilize any appropriate reporting format and include, for example, audience ratings, media content access metrics (e.g., such as popularity rankings). Furthermore, the report(s) 160 can report the audience measurement data for the entire specified demographic and network usage profiles, or some subset (e.g., classification stratum or strata) of the specified demographic and/or network usage profiles.

While an example manner of implementing the environment of use 100 has been illustrated in FIG. 1, one or more of the elements, processes and/or devices illustrated in FIG. 1 may be combined, divided, re-arranged, omitted, eliminated and/or implemented in any other way. Further, the example representative sampling unit 105, the example provider network 110, the example customer database(s) 115, the example networks server(s) 120, the example firewall 125, the example measurement server(s) 130, the example measurement entity network 135, the example secure communication link 140, the example communication network 145, the example firewall 150 and/or, more generally, the example environment of use 100 of FIG. 1 may be implemented by hardware, software, firmware and/or any combination of hardware, software and/or firmware. Thus, for example, any of the example representative sampling unit 105, the example provider network 110, the example customer database(s) 115, the example networks server(s) 120, the example firewall 125, the example measurement server(s) 130, the example measurement entity network 135, the example secure communication link 140, the example communication network 145, the example firewall 150 and/or, more generally, the example environment of use 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example environment of use 100, the example representative sampling unit 105, the example provider network 110, the example customer database(s) 115, the example networks server(s) 120, the example firewall 125, the example measurement server(s) 130, the example measurement entity network 135, the example secure communication link 140, the example communication network 145 and/or the example firewall 150 are hereby expressly defined to include a tangible medium such as a memory, digital versatile disk (DVD), compact disk (CD), etc., storing such software and/or firmware. Further still, the example environment of use 100 of FIG. 1 may include one or more elements, processes and/or devices in addition to, or instead of, those illustrated in FIG. 1, and/or may include more than one of any or all of the illustrated elements, processes and devices.

A block diagram of an example implementation of the representative sampling unit 105 of FIG. 1 is illustrated in FIG. 2. The representative sampling unit 105 of FIG. 2 includes an example profile specifier 205 to obtain one or more demographic profiles and one or more network usage profiles specified by an audience measurement entity. Generally, a demographic profile includes a set of demographic categories, with each demographic category including a set of target segments (e.g., also referred to as target strata) associated respectively with a set of target population percentages. Similarly, a network usage profile generally includes a set of usage categories associated respectively with another set of target population percentages. An example demographic profile 305 and an example network usage profile 310 that could be obtained by the profile specifier 205 are illustrated in FIG. 3.

Turning to FIG. 3, the example demographic profile 305 includes two (2) categories, an age category 312 and an income category 314 (although other categories could be included instead of, or in addition to, either or both of these two categories). The age category 312 includes a set of target age segments (or strata) 316-320. For example, a first target age segment (or stratum) 316 may correspond to the population segment of people under 18 years old, a second target age segment 318 may correspond to people from 18 to 34 years old, and a third target age segment 320 may correspond to people greater than 34 years old. Each target segment 316-320 is associated with a respective target population percentage 326-330. Each target population percentage 326-330 can be a particular percentage value (e.g., such as 5%, 10%, etc.) or a range of percentage values (e.g., such as 5-10%, 10-15%, etc.). Similarly, the income category 314 includes a set of target segments 336-340. For example, a first target income segment 336 may correspond to the population segment of people having an annual income under $40,000, a second target income segment 338 may correspond to people having an annual income from $40,000 to $100,000, and a third target income segment 340 may correspond to people having an annual income over $100,000. Each target segment 336-340 is associated with a respective target population percentage 346-350. As noted above, each target population percentage 346-350 can be a particular percentage value or a range of percentage values.

The example network usage profile 310 includes three (3) usage categories (or strata) 352-356 (although more or fewer categories could be included in an example implementation). For example, the first usage category (or stratum) 352 corresponds to customers that exhibit low network usage, the second usage category 354 corresponds to customers that exhibit medium network usage, and the third usage category 352 corresponds to customers that exhibit high network usage. Network usage can be characterized in terms of, for example, network accesses during a time period, bandwidth used during a time period, bandwidth purchased during a time period, etc. For example, a low network user could be a customer who accesses content via the provider network 110 approximately one time per week, a medium network user could be a customer who accesses content from one to five times per week, and a high network user could be a customer who accesses content greater than five times per week. As another example, a low network user could be a customer who accesses or purchases less than one megabyte of content per week, a medium network user could a customer who accesses or purchase from one to five megabytes of content per week, and a high network user could be a customer who accesses or purchases greater than five megabytes of content per week. These preceding values are exemplary and not meant to be limiting. Similar to the demographic profile 305, each category (or stratum) 352-356 in the network usage profile 310 is associated with a respective target population percentage 362-366, which can be a particular percentage value or a range of percentage values.

Returning to FIG. 2, the illustrated representative sampling unit 105 includes an example customer sample generator 210 to sample customer data stored in records of, for example, the customer database(s) 115 of FIG. 1 to generate a customer sample (e.g., such as a single customer sample) containing a subset of customers representative of, for example, a particular demographic profile and a particular network usage profile obtained by the profile specifier 205. The customer sample generator 210 employs an example customer database interface 215 to query the customer database(s) 115 and retrieve query results from the customer database(s) 115. In an example implementation, the customer sample generator 210 uses the customer database interface 215 to index the customer data stored in the customer database according to the demographic categories included in the obtained demographic profile to determine indexed customer data. For example, with reference to the example demographic profile 305 of FIG. 3, the customer sample generator 210 can use the customer database interface 215 to index (e.g., via sorting) the customer data in the customer database(s) 115 into: (i) a first group corresponding to customers included in both the first target age segment 316 and the first target income segment 336; (ii) a second group corresponding to customers included in both the first target age segment 316 and the second target income segment 338; (iii) a third group corresponding to customers included in both the first target age segment 316 and the third target income segment 338, etc., until the customers are indexed into all possible groupings of target age and income segments. Then, in such an example implementation, the customer sample generator 210 randomly samples (e.g., selects) the indexed customer data according to the target population percentages included in the obtained demographic profile to randomly select a subset of customers representative of the demographic profile. For example, with reference to the preceding example based on the demographic profile 305 of FIG. 3, the customer sample generator 210 could randomly select customers from the first group (e.g., corresponding to customers included in both the first target age segment 316 and the first target income segment 336) such that the number of customers selected relative to the total number of customers in the customer sample is determined by multiplying the target population percentages 326 and 346.

In at least some example implementations, customer network usage information is also stored in the customer database(s) 115 (e.g., such as when network usage corresponds to purchased network bandwidth). In such examples, the customer sample generator 210 can use the customer database interface 215 as described above to generate another customer sample representative of the obtained network usage profile by indexing the customer data stored in the customer database according to the set of network categories included in the obtained network usage profile, and then randomly sampling (e.g., selecting) the indexed customer data according to the target population percentages included in the obtained network usage profile to randomly select a subset of customers representative of the network usage profile. Additionally or alternatively, the customer sample generator 210 can use the customer database interface 215 to generate a single customer sample representative of both the obtained demographic and network usage profiles. With reference to the example demographic profile 305 and the example network usage profile 310 of FIG. 3, in such an example, the customer sample generator 210 can treat the network usage profile 310 as another dimension (e.g., category) of the demographic profile 305. In other words, the customer sample generator 210 can use the customer database interface 215 to index (e.g., via sorting) the customer data in the customer database(s) 115 into: (i) a first group corresponding to customers included in a combination of the first target age segment 316, the first target income segment 336, and the low network usage category 352; (ii) a second group corresponding to customers included in a combination of the first target age segment 316, the first target income segment 336 and the medium network usage category 354, etc., until the customers are indexed into all possible groupings of target age and income segments, as well as network usage categories. Then, the customer sample generator 210 randomly samples (e.g., selects) the indexed customer data according to the target population percentages included in the obtained demographic and network usage profiles to randomly select a subset of customers representative of both the demographic and network usage profiles (e.g., such that each indexed group includes a number of randomly selected customers whose percentage of the entire selected subset of customers corresponds to the multiplication of the individual target population percentages of the population segments making up the group).

The customer sample generator 210 can employ any type of random or pseudorandom sampling technique to sample the customer data included in the customer database(s) 115. After generating customer sample(s) representative of the obtained demographic profile (and/or the obtained network usage profile if network usage information is stored in the customer database(s) 115), the customer sample generator 210 stores the generated customer sample(s) in a customer sample storage 220. The customer sample storage 220 may be implemented by any type or memory or storage device or technology, such as the mass storage device 730 and/or the volatile memory 718 included in the example processing system 700 illustrated in FIG. 7 and described in greater detail below.

The representative sampling unit 105 also includes an example measurement data sampler 225 to obtain and process server log data for the customers included in the customer sample(s) stored in the customer sample storage 220. For example, the measurement data sampler 225 uses an example server log interface 230 to retrieve server log data from the network server(s) 120 for customers included in a customer sample generated by the customer sample generator 210, but not for customers not included in the customer sample. Alternatively, in an example real-time sampling implementation, the measurement data sampler 225 configures the network server(s) 120 to automatically provide (e.g., via a push mechanism) the server log data for customers included in the customer sample generated by the customer sample generator 210, but not for customers not included in the customer sample. In an example implementation, customer identification information and, in particular, customer device identification information (e.g., such as phone numbers, IP addresses, usernames, PINs, cookie identifiers, etc.) included in the customer sample is used to retrieve the server log data for those customers included in the customer sample, or configure the network server(s) 120 to automatically provide (e.g., push) the server log data for those customers included in the customer sample. Thus, for each customer in the customer sample, server log data that includes or is otherwise associated with customer identification information (e.g., such as a phone numbers IP address, etc.) representative of that particular customer is retrieved or otherwise obtained (e.g., automatically via a push mechanism) by the measurement data sampler 225 from the network server(s) 120.

To generate audience measurement data (e.g., offline using the retrieved server log data or in real-time using the automatically provided/pushed server log data), the measurement data sampler 225 then classifies the server log data for each customer in the customer sample into the particular demographic category or categories into which the particular customer belongs (as well as into the particular customer's network usage category if known from the customer data stored in the customer database(s) 115). Additionally or alternatively, such as in example implementations in which customer network usage information is not stored in the customer database(s) 115, the measurement data sampler 225 processes the server log data to determine the network usage category for each customer in the customer sample, thereby allowing the measurement data sampler 225 to classify the particular customer's server log data into a particular network usage category. For example, the measurement data sampler 225 may analyze the server log data to determine the network accesses during a time period, bandwidth used during a time period, etc., to determine the network usage category for each customer included in the customer sample and, thus, the actual network usage profile of the customer sample.

The representative sampling unit 105 further includes an example profile verifier 240 to determine whether the server log data retrieved and processed by the measurement data sampler 225 corresponds to (e.g., is representative of) the demographic and network usage profiles obtained by the profile specifier 205 as specified by the audience measurement entity. For example, in operating scenarios in which the customer databases(s) 115 do not store network usage information for each customer, the customer sample generated by the customer sample generator 210 will be representative of the obtained demographic profile, but may or may not be representative of the obtained network usage profile. In such operating scenarios, the profile verifier 240 compares the actual network usage profile for the customer sample (e.g., as determined by the measurement data sampler 225 from the server log data) with the obtained network usage profile to determine whether the profiles match or substantially match within some tolerance limit for each network usage category. If the profiles do not match, the profile verifier 240 causes the customer sample generator 210 to update the customer sample by, for example, (1) randomly removing customers from the sample belonging to each network usage category whose actual percentage of customers exceeds the specified percentage, and (2) replacing the removed customers with new, randomly sampled customers belonging to the same demographic categories as the removed customers. The measurement data sampler 225 then obtains server log data for these newly sampled customers and recomputes the actual network usage profile for the updated customer sample. This profile verifier 240 iteratively repeats this procedure until the actual network usage profile of the customer sample matches the specified network usage and demographic profiles and/or a specified number of iterations is performed.

To render the resulting audience measurement data determined by the measurement data sampler 225 and verified by the profile verifier 240 private, the representative sampling unit 105 includes an example privacy unit 245. The privacy unit 245 removes any customer identification information that could be used to identify particular customers, such as customer device identification information (e.g., phone numbers, IP addresses, etc.) included in the audience measurement data (e.g., as part of the retrieved server log data). In some examples, the privacy unit 245 replaces the removed customer identification information with anonymous identifiers that can be used to group associated data without actually identifying any of the customers. However, the privacy unit 245 retains any demographic and usage classification information included in the audience measurement data (e.g., as determined by the measurement data sampler 225). The representative sampling unit 105 includes a data transmission unit 250 to transmit the anonymous audience measurement data to the measurement server(s) of the audience measurement entity for subsequent processing.

While an example manner of implementing the representative sampling unit 105 of FIG. 1 has been illustrated in FIG. 2, one or more of the elements, processes and/or devices illustrated in FIG. 2 may be combined, divided, re-arranged, omitted, eliminated and/or implemented in any other way.

Further, the example profile specifier 205, the example customer sample generator 210, the example customer database interface 215, the example customer sample storage 220, the example measurement data sampler 225, the example server log interface 230, the example profile verifier 240, the example privacy unit 245, the example data transmission unit 250 and/or, more generally, the example representative sampling unit 105 of FIG. 2 may be implemented by hardware, software, firmware and/or any combination of hardware, software and/or firmware. Thus, for example, any of the example profile specifier 205, the example customer sample generator 210, the example customer database interface 215, the example customer sample storage 220, the example measurement data sampler 225, the example server log interface 230, the example profile verifier 240, the example privacy unit 245, the example data transmission unit 250 and/or, more generally, the example representative sampling unit 105 could be implemented by one or more circuit(s), programmable processor(s), application ASIC(s), PLD(s) and/or FPLD(s), etc. When any of the appended claims are read to cover a purely software and/or firmware implementation, at least one of the example representative sampling unit 105, the example profile specifier 205, the example customer sample generator 210, the example customer database interface 215, the example customer sample storage 220, the example measurement data sampler 225, the example server log interface 230, the example profile verifier 240, the example privacy unit 245 and/or the example data transmission unit 250 are hereby expressly defined to include a tangible medium such as a memory, DVD, CD, etc., storing such software and/or firmware. Further still, the example representative sampling unit 105 of FIG. 2 may include one or more elements, processes and/or devices in addition to, or instead of, those illustrated in FIG. 2, and/or may include more than one of any or all of the illustrated elements, processes and devices.

Figure 4:
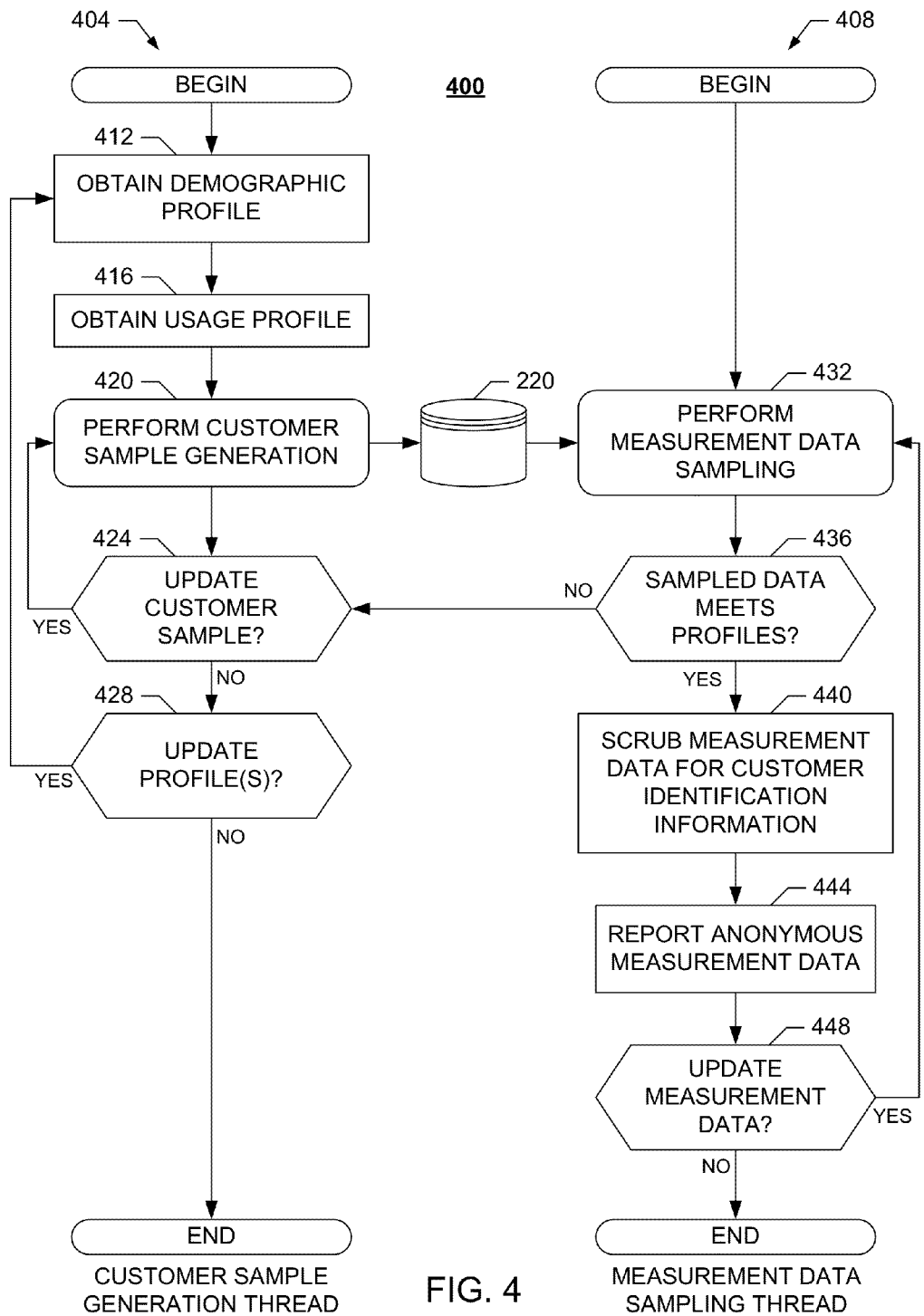
FIG. 4 is a flowchart representative of example machine readable instructions that may be executed to implement the representative sampling unit of FIGS. 1 and/or 2.
Figure 5:
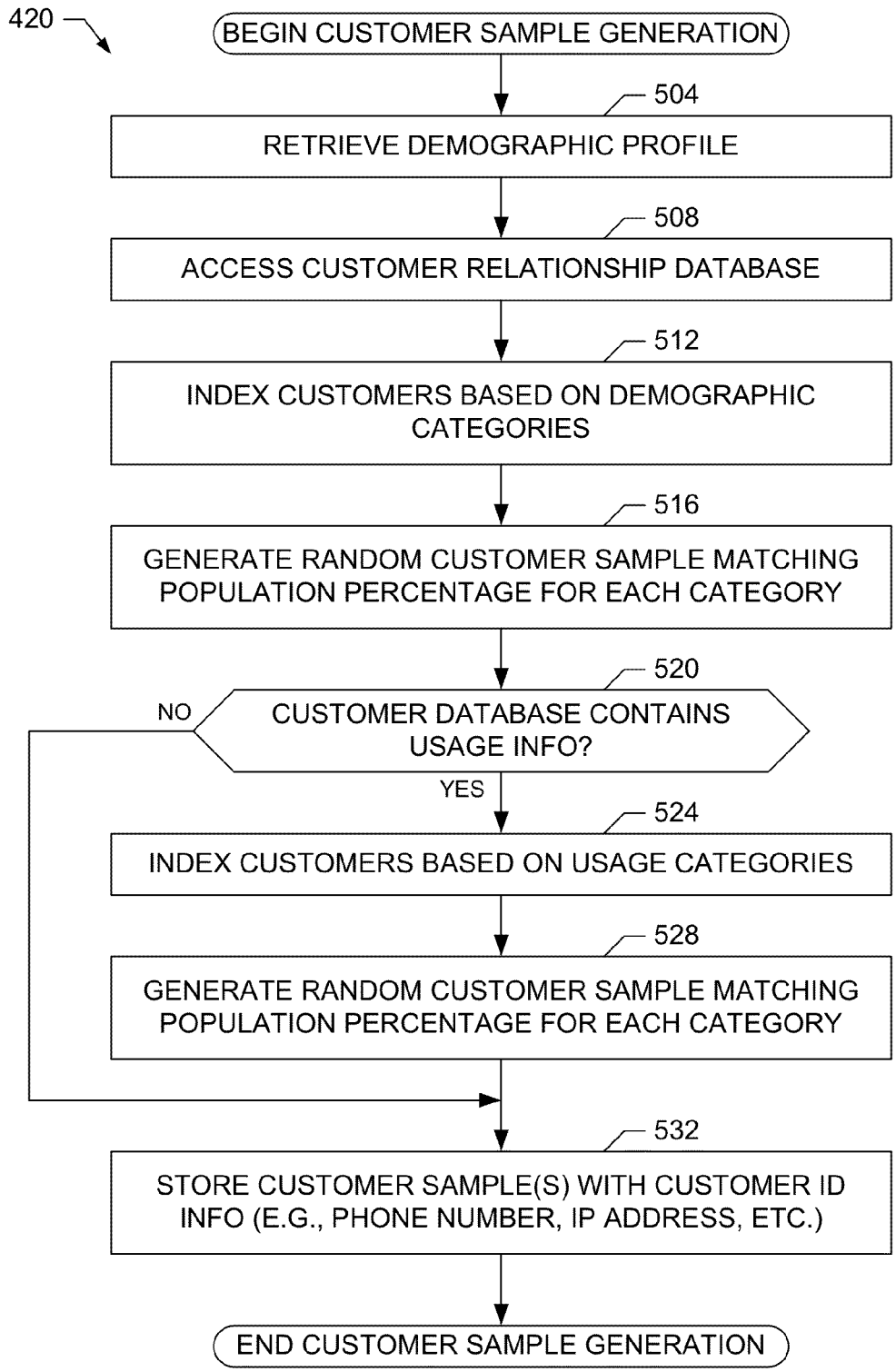
FIG. 5 is a flowchart representative of example machine readable instructions that may be used to implement the example machine readable instructions of FIG. 4 and/or executed to perform a customer sample generation process to implement the representative sampling unit of FIGS. 1 and/or 2.
Figure 6:
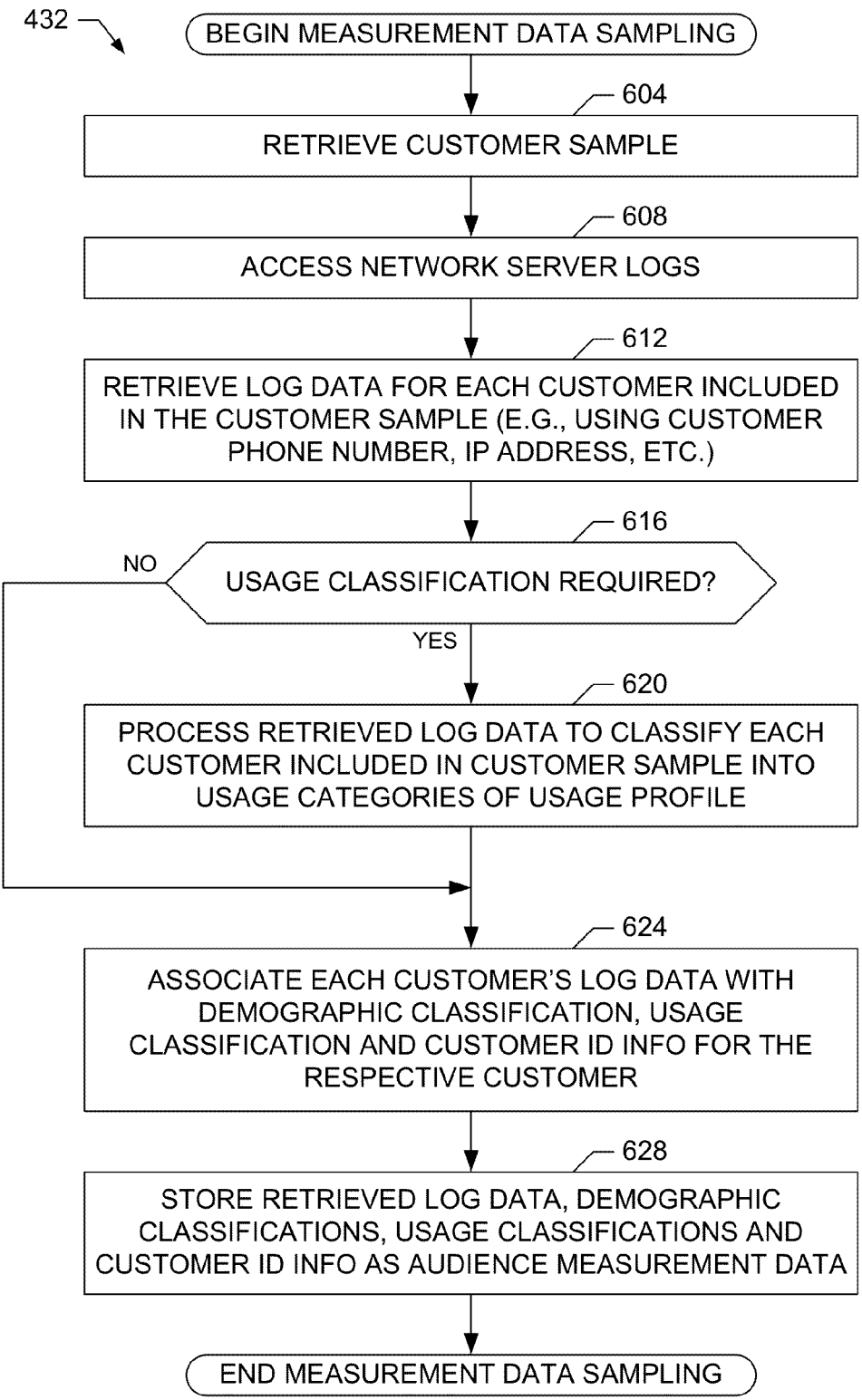
FIG. 6 is a flowchart representative of example machine readable instructions that may be used to implement the example machine readable instructions of FIG. 4 and/or executed to perform a measurement data sampling process to implement the representative sampling unit of FIGS. 1 and/or 2.

Flowcharts representative of example machine readable instructions that may be executed to implement the example environment of use 100, the example representative sampling unit 105, the example provider network 110, example customer database(s) 115, the example networks server(s) 120, the example firewall 125, the example measurement server(s) 130, the example measurement entity network 135, the example secure communication link 140, the example communication network 145, the example firewall 150, the example profile specifier 205, the example customer sample generator 210, the example customer database interface 215, the example customer sample storage 220, the example measurement data sampler 225, the example server log interface 230, the example profile verifier 240, the example privacy unit 245 and/or the example data transmission unit 250 are shown in FIGS. 4-6. In these examples, the machine readable instructions represented by each flowchart may comprise one or more programs for execution by: (a) a processor, such as the processor 712 shown in the example processing system 700 discussed below in connection with FIG. 7, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 712, but the entire program or programs and/or portions thereof could alternatively be executed by a device other than the processor 712 and/or embodied in firmware or dedicated hardware (e.g., implemented by an ASIC, a PLD, an FPLD, discrete logic, etc.).

For example, any or all of the example environment of use 100, the example representative sampling unit 105, the example provider network 110, example customer database(s) 115, the example networks server(s) 120, the example firewall 125, the example measurement server(s) 130, the example measurement entity network 135, the example secure communication link 140, the example communication network 145, the example firewall 150, the example profile specifier 205, the example customer sample generator 210, the example customer database interface 215, the example customer sample storage 220, the example measurement data sampler 225, the example server log interface 230, the example profile verifier 240, the example privacy unit 245 and/or the example data transmission unit 250 could be implemented by any combination of software, hardware, and/or firmware. Also, some or all of the machine readable instructions represented by the flowchart of FIGS. 4-6 may be implemented manually. Further, although the example machine readable instructions are described with reference to the flowcharts illustrated in FIGS. 4-6, many other techniques for implementing the example methods and apparatus described herein may alternatively be used. For example, with reference to the flowcharts illustrated in FIGS. 4-6, the order of execution of the blocks may be changed, and/or some of the blocks described may be changed, eliminated, combined and/or subdivided into multiple blocks.

Example machine readable instructions 400 that may be executed to implement the example representative sampling unit 105 of FIGS. 1 and/or 2 are represented by the flowchart shown in FIG. 4. The example machine readable instructions 400 may be executed at predetermined intervals, based on an occurrence of a predetermined event, etc., or any combination thereof. As illustrated in FIG. 4, the example machine readable instructions 400 implement two processing threads, a customer sample generation thread 404 and a measurement data sampling thread 408. In at least some example implementations, the measurement data sampling thread 408 executes more frequently than the customer sample generation thread 404. For example, demographic and network usage profiles are expected to be updated relatively infrequently as customers are gained, lost, update service profiles, etc., on a relatively infrequent basis, such as daily, weekly, monthly, quarterly, etc. Thus, the customer sample generation thread 404 can be executed at a similarly infrequent rate to generate a customer sample corresponding to a newly updated demographic and/or network usage profiles, with potentially more frequent invocations to update the customer sample when its actual network usage profile does not correspond with the specified network usage profile, as described below. In contrast, the measurement data sampling thread 408 is expected to be executed more frequently, such as every minute, every few minutes (e.g., such as every 15 minutes), hourly, daily, etc., depending upon the desired temporal accuracy of the generated audience measurement data.

With reference to FIGS. 1-3, the customer sample generation thread 404 of the machine readable instructions 400 of FIG. 4 begins execution at block 412 at which the profile specifier 205 included in the representative sampling unit 105 obtains a demographic profile, such as the demographic profile 305, from the audience measurement entity operating the audience measurement server(s) 130. At block 416, the profile specifier 205 included in the representative sampling unit 105 obtains a network usage profile, such as the network usage profile 310, from the audience measurement entity operating the audience measurement server(s) 130. Then, at block 420 the customer sample generator 210 included in the representative sampling unit 105 samples customer data stored in records of the customer database(s) 115 to generate a customer sample containing a subset of customers representative of the demographic profile and the network usage profile obtained at block 412 and 416, respectively. The generated customer sample is stored in the customer sample storage 220. Example machine readable instructions that may be used to implement the processing at block 420 are illustrated in FIG. 5 and described in greater detail below.

After customer sample generation is performed at block 420, at block 424 the customer sample generator 210 determines whether the customer sample generated at block 420 needs to be updated. For example, the profile verifier 240 included in the representative sampling unit 105 may indicate that that the customer sample needs to be updated if an actual network usage profile for the customer sample (e.g., as determined from sample server log data) and the specified network usage profile obtained at block 416 fail to match or substantially match within a specified tolerance. If the customer sample needs to be updated (block 424), processing returns to block 420 at which the customer sample is updated. However, if the customer sample does not need to be updated (block 424), at block 428 the profile specifier 205 determines whether there has been an update to the specified demographic and/or network usage profiles. If one or both of the profiles are to be updated (block 428), processing returns to block 412. Otherwise, execution of the customer sample generation thread 404 ends until it is time to be invoked to generate a new customer sample.

The measurement data sampling thread 408 of the machine readable instructions 400 of FIG. 4 begins execution at block 432 at which the measurement data sampler 225 included in the representative sampling unit 105 retrieves server log data from the network server(s) 120 for the customers contained in the customer sample stored in the customer sample storage 220. Alternatively, in an example real-time sampling implementation, the network server(s) 120 can automatically provide (e.g., via a push mechanism) their server log data to the representative sampling unit 105 for sampling as the data becomes available in real-time. Additionally, at block 432 the measurement data sampler 225 determines audience measurement data from the retrieved (or provided/pushed) server log data. Example machine readable instructions that may be used to implement the processing at block 432 are illustrated in FIG. 6 and described in greater detail below.

After measurement data sampling is performed at block 432, at block 436 the profile verifier 240 determines whether the actual network usage profile determined by the measurement data sampler 225 from the retrieved server logs corresponds to the specified network usage profile obtained at block 416. If the actual and specified network usage profiles do not correspond (block 436), the profile verifier 240 invokes block 424 of the customer sample generation thread 404 with an indication that the customer sample needs to be updated. However, if the actual and specified network usage profiles do correspond (block 436), then at block 440 the privacy unit 245 included in the representative sampling unit 105 scrubs the audience measurement data determined at block 432 to remove any customer identification information, but to retain any other demographic and/or network usage classifications. Then, at block 444 the data transmission unit 250 included in the representative sampling unit 105 transmits the resulting anonymous measurement data to the audience measurement entity's measurement server(s) 130. Then, at block 448 the measurement data sampler 225 determines whether it is time to update the measurement data sample. If it is time to update the measurement data (block 448), then processing returns to block 432 at which the measurement data sampler 225 retrieves and processes new server log data to determine updated audience measurement data. Otherwise, execution of the measurement data sampling thread 408 ends until it is time to be invoked to generate new anonymous audience measurement data.

Example machine readable instructions 420 that may be used to implement the customer sample generation processing at block 420 of FIG. 4 are illustrated in FIG. 5. With reference to FIGS. 1-3, the machine readable instructions 420 of FIG. 5 begin execution at block 504 at which the customer sample generator 210 included in the representative sampling unit 105 retrieves the demographic profile obtained by the profile specifier 205 from the audience measurement entity. At block 508, the customer sample generator 210 accesses the customer database(s) 115, and at block 512 the customer sample generator 210 uses the customer data stored in the customer database(s) 115 to index the customers into groups based on the demographic categories included in the demographic profile retrieved at block 504. For example, at block 512 the customer sample generator 210 can generate groups for each possible permutation of selecting a particular demographic segment for each category across all the different categories included in the demographic profile. The customer sample generator 210 then places each customer in the appropriate demographic group based on the customer's identification and demographic data stored in the customer database(s) 115.

Next, at block 516 the customer sample generator 210 generates a random customer sample matching the target population percentage specified for each category in the demographic profile. For example, at block 516 the customer sample generator 210 determines an effective population percentage for each index group determined at block 512 by multiplying the target population percentages for each category's constituent population segment included in the particular index group. Then, for each index group, the customer sample generator 210 randomly samples (e.g., selects) a number of customers from each index group such that the ratio of the number of customers sampled from each index group to the total number of customer included in the customer sample corresponds to the determined effective population percentage for that particular item group. The result is a subset of customers whose actual demographic profile corresponds to the specified demographic profile obtained at block 504.

Next, at block 520 the customer sample generator 210 determines whether the customer database(s) 115 contain network usage information. If so, at block 524 the customer sample generator 210 begins generating another customer sample having the specified network usage profile obtained by the profile specifier 205. In particular, at block 524 the customer sample generator 210 uses the network usage data and associated customer identification information stored in the customer database(s) 115 to index (e.g., sort) the customers the different network usage categories included in the demographic profile retrieved at block 504. Then, at block 528 the customer sample generator 210 generates a random customer sample matching the target population percentage specified for each category in the network usage profile. For example, the customer sample generator 210 randomly samples (e.g., selects) a number of customers from each network usage category such that the ratio of the number of customers sampled from each network usage category to the total number of customer included in the customer sample corresponds to the target population for that particular network usage category. The result is a subset of customers whose actual network usage profile corresponds to the specified network usage profile obtained at block 504.

Alternatively, if the customer database(s) 115 contain network usage information, the processing at blocks 512 through 528 can be combined to generate a customer sample representative of both the obtained demographic and network usage profiles. In such an example, the set of network usage categories in the specified network usage profile is treated as another dimension (e.g., as another demographic category) of the specified demographic profile, as described above, when indexing and sampling the customers (e.g., at blocks 512 and 516) to generate the customer sample.

Next, at block 532 the customer sample generator 210 stores the customer sample or samples generated at blocks 516 and 528 in the customer sample storage 220. Execution of the example machine readable instructions 420 then ends.

Example machine readable instructions 432 that may be used to implement the measurement data sampling processing at block 432 of FIG. 4 are illustrated in FIG. 6. With reference to FIGS. 1-3, execution of the machine readable instructions 432 of FIG. 6 begins at block 604 at which the measurement data sampler 225 retrieves a customer sample generated by the customer sample generator 210 from customer sample storage 220. At block 608, the measurement data sampler 225 accesses the network server logs maintained by the network server(s) 120, and at block 612 the measurement data sampler 225 retrieves the server log data for customers included in the customer sample retrieved at block 604. For example, at block 612 the measurement data sampler 225 can use customer identification information, such as customer device identification information (e.g., phone numbers, IP addresses, etc.) to retrieve server log data for customers included in the customer sample, but not for other customers (e.g., by matching device identification information included in the network server logs).

Next, at block 616 the measurement data sampler 225 determines whether the customers included in the customer sample need to be classified into the network usage categories of the obtained network usage profile (e.g., such as when network usage information is not included in the customer database(s) 115 and, thus, a customer sample having the specified network usage profile cannot be determined a priori). If network usage classification is needed (block 616), at block 620 the measurement data sampler 225 processes the server log data retrieved at block 612 to classify each customer in the customer sample into a particular network usage category, as described above. Then, at block 624 the measurement data sampler 225 associates (e.g., classifies) each customer's server log data (e.g., which is already associated with the customer's identification information) with the demographic classification and network usage classification (e.g., the latter if known from customer data stored in the customer database(s)) into which the particular customer belongs. The measurement data sampler 225 stores the retrieved server log data and associated customer identification information, demographic classifications and network usage classifications as audience measurement data at block 628. Execution of the machine readable instructions 432 then ends.

Figure 7:
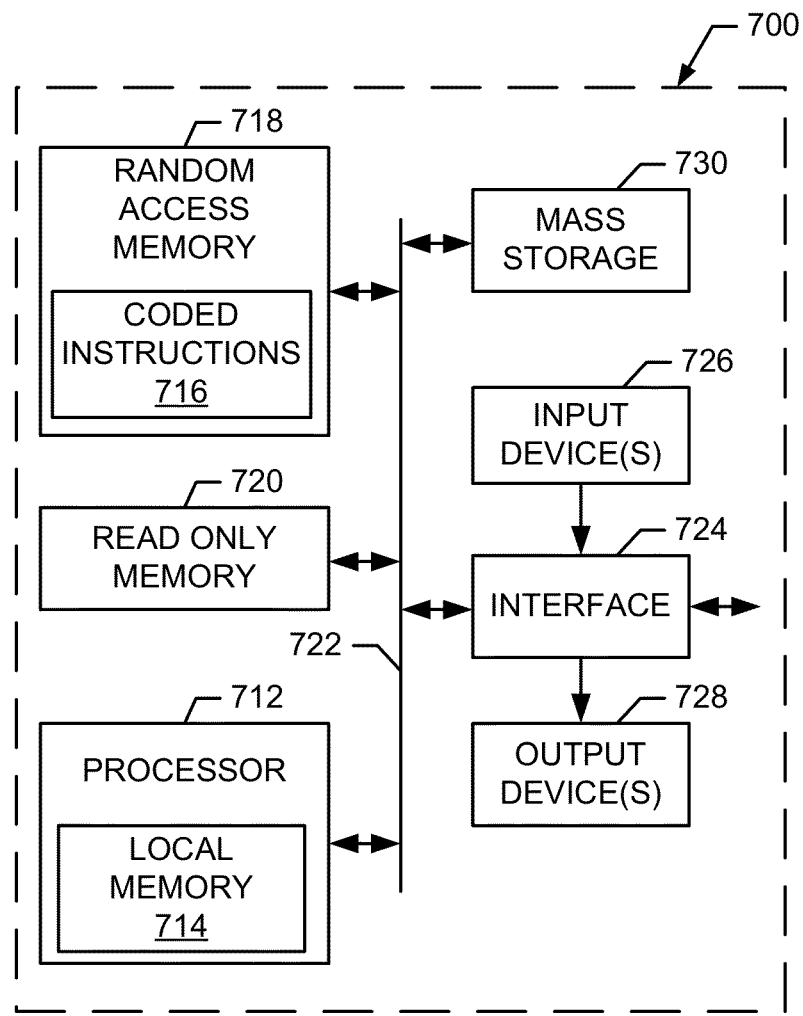
FIG. 7 is a block diagram of an example processing system that may execute the example machine readable instructions of FIGS. 4-6 to implement the representative sampling unit of FIGS. 1 and/or 2, and/or the example environment of use of FIG. 1.

FIG. 7 is a block diagram of an example processing system 700 capable of implementing the apparatus and methods disclosed herein. The processing system 700 can be, for example, a server, a personal computer, a personal digital assistant (PDA), an Internet appliance, a DVD player, a CD player, a digital video recorder, a personal video recorder, a set top box, or any other type of computing device.

The system 700 of the instant example includes a processor 712 such as a general purpose programmable processor. The processor 712 includes a local memory 714, and executes coded instructions 716 present in the local memory 714 and/or in another memory device. The processor 712 may execute, among other things, the machine readable instructions represented in FIGS. 4-6. The processor 712 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 712 is in communication with a main memory including a volatile memory 718 and a non-volatile memory 720 via a bus 722. The volatile memory 718 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 720 may be implemented by flash memory and/or any other desired type of memory device. Access to the main memory 718, 720 is typically controlled by a memory controller (not shown).

The processing system 700 also includes an interface circuit 724. The interface circuit 724 may be implemented by any type of interface standard, such as an Ethernet interface, a universal serial bus (USB), and/or a third generation input/output (3GIO) interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, an isopoint and/or a voice recognition system.

One or more output devices 728 are also connected to the interface circuit 724. The output devices 728 can be implemented, for example, by display devices (e.g., a liquid crystal display, a cathode ray tube display (CRT)), by a printer and/or by speakers. The interface circuit 724, thus, typically includes a graphics driver card.

The interface circuit 724 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 700 also includes one or more mass storage devices 730 for storing software and data. Examples of such mass storage devices 730 include floppy disk drives, hard drive disks, compact disk drives and digital versatile disk (DVD) drives. The mass storage device 730 may implement the customer sample storage 220. Alternatively, the volatile memory 718 may implement the customer sample storage 220.

As an alternative to implementing the methods and/or apparatus described herein in a system such as the processing system of FIG. 7, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to provide anonymous audience measurement data to a recipient, the method comprising:

sampling, with a processor, customer data stored in a customer database to generate a first customer ample representative of a demographic profile, the first customer sample including first customer identification information for a first subset of customers represented in the first customer sample;

processing, with the processor, log data obtained from a network server using the first customer identification information to determine first audience measurement data associated with the first subset of customers in the first customer sample, the first audience measurement data including the first customer identification information; and in response to verifying, based on the log data, that the first customer sample is also representative of a network usage profile in addition to the demographic profile, removing, with the processor, the first customer identification information from the first audience measurement data to determine the anonymous audience measurement data to send to the recipient.

2. A method as defined in claim 1, further comprising:

retaining demographic information in the anonymous audience measurement data, the demographic information to permit classification of the anonymous audience measurement data according to the demographic profile without having access to the first customer identification information; and sending the anonymous audience measurement data to the recipient to permit the recipient to perform audience measurement operations using the anonymous audience measurement data without having access to the customer database and the network server.

3. A method as defined in claim 1, further comprising obtaining at least one of the demographic profile or the network usage profile from the recipient.

4. A method as defined in claim 1, wherein sampling the customer data stored in the customer database comprises:

indexing the customer data into data groups associated with different possible combinations of target demographic segments specified in the demographic profile; and sampling data from respective ones of the data groups according to target population percentages associated with the respective ones of the data groups, the target population percentages determined from the demographic profile.

5. A method as defined in claim 4, wherein the demographic profile specifies a first demographic category divided into a first plurality of target demographic segments and a second demographic category divided into a second plurality of target demographic segments, and sampling the customer data stored in the customer database further comprises determining the different possible combinations of target demographic segments to correspond to different possible permutations of the first plurality of target demographic segments and the second plurality of target demographic segments.

6. A method as defined in claim 1, wherein the first customer identification information includes device identification information associated with a first customer in the first customer sample, and processing the log data obtained from the network server further comprises:

retrieving first log data associated with the first customer from the network server using the device identification information;

determining a first demographic category to which the first customer belongs, the first demographic category included in a plurality of demographic categories specified in the demographic profile; and classifying the first log data into the first demographic category.

7. A method as defined in claim 1, further comprising:

processing the log data to determine actual network usage for the first subset of customers included in the first customer sample; and determining that the first customer sample is representative of the network usage profile when the actual network usage is determined to substantially match the network usage profile.

8. A method as defined in claim 1, further comprising, in response to the log data indicating that the first customer sample is not representative of the network usage profile:

updating the first customer sample to determine a second customer sample representative of the demographic profile, the second customer sample including second customer identification information for a second subset of customers represented in the second customer sample;

processing the log data obtained from the network server using the second customer identification information to determine second audience measurement data associated with the second subset of customers in the second customer sample, the second audience measurement data including the second customer identification information; and in response to the log data indicating that the second customer sample is also representative of the network usage profile, removing the second customer identification information from the second audience measurement data to determine the anonymous audience measurement data to send to the recipient.

9. A tangible machine readable storage device or storage disk comprising machine readable instructions which, when executed, cause a machine to at least:

sample customer data stored in a customer database to generate a first customer sample representative of a demographic profile, the first customer sample including first customer identification information for a first subset of customers represented in the first customer sample;

process log data obtained from a network server using the first customer identification information to determine first audience measurement data associated with the first subset of customers in the first customer sample, the first audience measurement data including the first customer identification information;

verify, based on the log data, whether the first customer sample is also representative of a network usage profile in addition to the demographic profile; and in response to the first customer sample being verified to be representative of the network usage profile in addition to the demographic profile, remove the first customer identification information from the first audience measurement data to determine anonymous audience measurement data to send to a recipient.

10. A storage device or storage disk as defined in claim 9, wherein the instructions, when executed, further cause the machine to obtain at least one of the demographic profile or the network usage profile from the recipient.

11. A storage device or storage disk as defined in claim 9, wherein to sample the customer data stored in the customer database, the instructions, when executed, further cause the machine to:

index the customer data into data groups associated with different possible combinations of target demographic segments specified in the demographic profile; and sample data from respective ones of the data groups according to target population percentages associated with the respective ones of the data groups, the target population percentages determined from the demographic profile.

12. A storage device or storage disk as defined in claim 11, wherein the demographic profile specifies a first demographic category divided into a first plurality of target demographic segments and a second demographic category divided into a second plurality of target demographic segments, and the instructions, when executed, further cause the machine to determine the different possible combinations of target demographic segments to correspond to different possible permutations of the first plurality of target demographic segments and the second plurality of target demographic segments.

13. A storage device or storage disk as defined in claim 9, wherein the first customer identification information includes device identification information associated with a first customer in the first customer sample, and, to process the log data obtained from the network server, the instructions, when executed, further cause the machine to:
　access first log data associated with the first customer from the network server using the device identification information;
　determine a first demographic category to which the first customer belongs, the first demographic category included in a plurality of demographic categories specified in in the demographic profile; and
　classify the first log data into the first demographic category.

14. A storage device or storage disk as defined in claim 9, wherein the instructions, when executed, further cause the machine to:
　process the log data to determine actual network usage for the first subset of customers included in the first customer sample; and
　determine that the first customer sample is representative of the network usage profile when the actual network usage is determined to substantially match the network usage profile.

15. A storage device or storage disk as defined in claim 9, wherein the instructions, when executed, further cause the machine to, in response to the log data indicating that the first customer sample is not representative of the network usage profile:
　update the first customer sample to determine a second customer sample representative of the demographic profile, the second customer sample including second customer identification information for a second subset of customers represented in the second customer sample;
　process the log data obtained from the network server using the second customer identification information to determine second audience measurement data associated with the second subset of customers in the second customer sample, the second audience measurement data including the second customer identification information; and
　in response to the log data indicating that the second customer sample is also representative of the network usage profile, remove the second customer identification information from the second audience measurement data to determine the anonymous audience measurement data to send to the recipient.

16. A storage device or storage disk as defined in claim 9, wherein the instructions, when executed, further cause the machine to:
　retain demographic information in the anonymous audience measurement data, the demographic information to permit classification of the anonymous audience measurement data according to the demographic profile without having access to the first customer identification information; and
　send the anonymous audience measurement data to the recipient to permit the recipient to perform audience measurement operations using the anonymous audience measurement data without having access to the customer database and the network server.

17. An apparatus to provide anonymous audience measurement data, the apparatus comprising:
　a customer sample generator to sample customer data stored in a customer database to generate a first customer sample representative of a demographic profile, the first customer sample including first customer identification information for a first subset of customers represented in the first customer sample;
　a measurement data sampler to process log data obtained from a network server using the first customer identification information to determine first audience measurement data associated with the first subset of customers in the first customer sample, the first audience measurement data including the first customer identification information; and
　a privacy unit to remove the first customer identification information from the first audience measurement data to determine the anonymous audience measurement data to send to a recipient in response to the first customer sample being verified, based on the log data, to also be representative of a network usage profile in addition to the demographic profile.

18. An apparatus as defined in claim 17, wherein to sample the customer data stored in the customer database, the customer sample generator is further to:
　index the customer data into data groups associated with different possible combinations of target demographic segments specified in the demographic profile; and
　sample data from respective ones of the data groups according to target population percentages associated with the respective ones of the data groups, the target population percentages determined from the demographic profile.

19. An apparatus as defined in claim 18, wherein the demographic profile specifies a first demographic category divided into a first plurality of target demographic segments and a second demographic category divided into a second plurality of target demographic segments, and the customer sample generator is further to determine the different possible combinations of target demographic segments to correspond to different possible permutations of the first plurality of target demographic segments and the second plurality of target demographic segments.

20. An apparatus as defined in claim 17, wherein the first customer identification information includes device identification information associated with a first customer in the first customer sample, and to process the log data obtained from the network server, the measurement data sampler is further to:
　retrieve first log data associated with the first customer from the network server using the device identification information;
　determine a first demographic category to which the first customer belongs, the first demographic category included in a plurality of demographic categories specified in in the demographic profile; and
　classify the first log data into the first demographic category.

21. An apparatus as defined in claim 17, wherein the measurement data sampler is further to:
   process the log data to determine actual network usage for the first subset of customers included in the first customer sample; and
   determine that the first customer sample is representative of the network usage profile when the actual network usage is determined to substantially match the network usage profile.

22. An apparatus as defined in claim 17, wherein in response to the log data indicating that the first customer sample is not representative of the network usage profile:
   the customer sample generator is further to update the first customer sample to determine a second customer sample representative of the demographic profile, the second customer sample including second customer identification information for a second subset of customers represented in the second customer sample;
   the measurement data sampler is further to process the log data obtained from the network server using the second customer identification information to determine second audience measurement data associated with the second subset of customers in the second customer sample, the second audience measurement data including the second customer identification information; and
   the privacy unit is further to remove the second customer identification information from the second audience measurement data to determine the anonymous audience measurement data to send to the recipient in response to the log data indicating that the second customer sample is also representative of the network usage profile.

23. An apparatus as defined in claim 17, further comprising a data transmission unit to:
   retain demographic information in the anonymous audience measurement data, the demographic information to permit classification of the anonymous audience measurement data according to the demographic profile without having access to the first customer identification information; and
   send the anonymous audience measurement data to the recipient to permit the recipient to perform audience measurement operations using the anonymous audience measurement data without having access to the customer database and the network server.

\* \* \* \* \*